April 21, 1953          J. D. WALKER          2,635,757
WATER CLARIFICATION APPARATUS AND METHOD
Filed March 16, 1950          2 SHEETS—SHEET 1
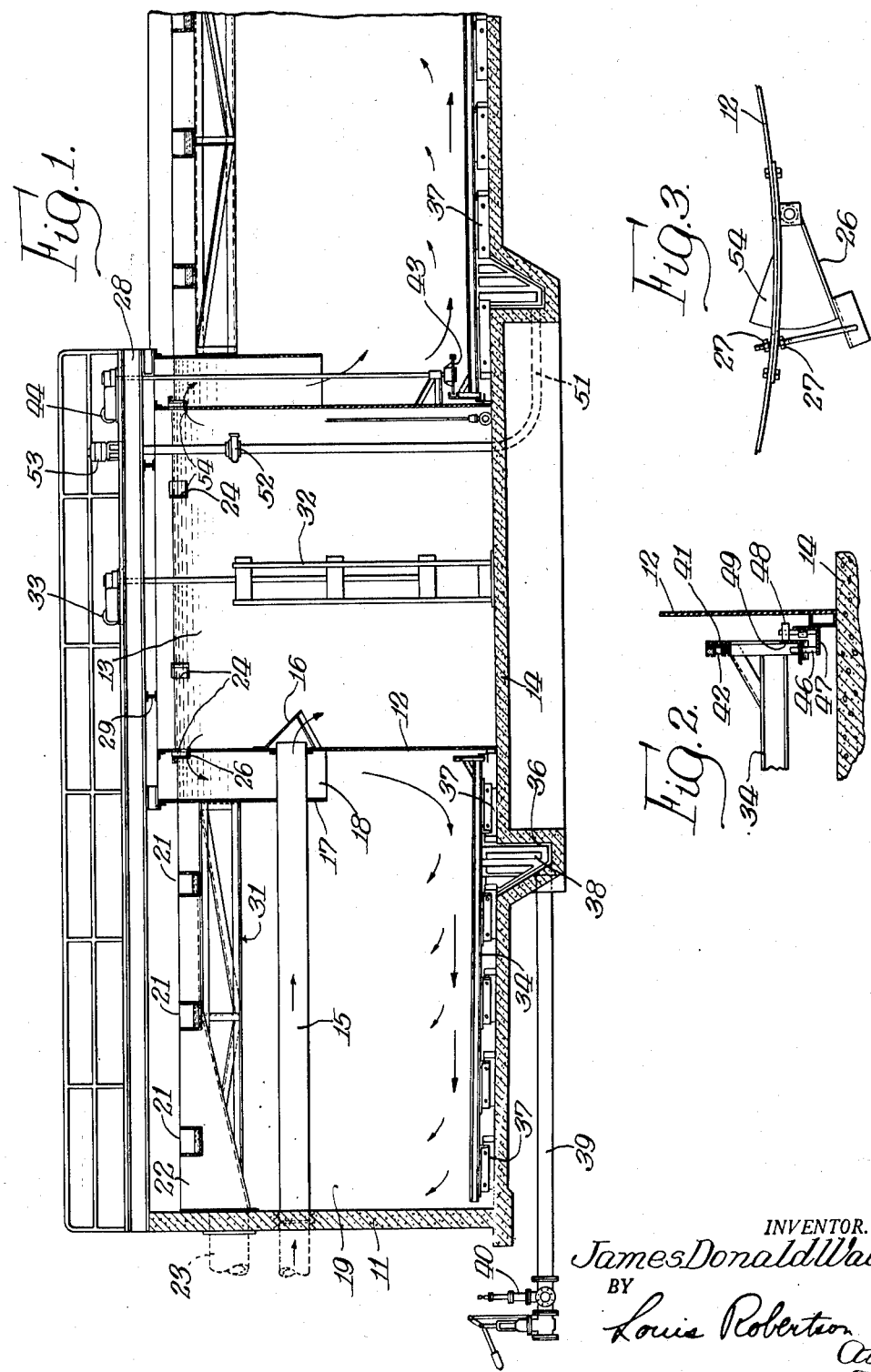
INVENTOR.
James Donald Walker,
BY
Louis Robertson
Atty.

April 21, 1953   J. D. WALKER   2,635,757
WATER CLARIFICATION APPARATUS AND METHOD
Filed March 16, 1950   2 SHEETS—SHEET 2

INVENTOR.
James Donald Walker,
BY
Louis Robertson
Atty.

UNITED STATES PATENT OFFICE 2,635,757

WATER CLARIFICATION APPARATUS AND METHOD

James Donald Walker, Aurora, Ill., assignor to Walker Process Equipment Inc., Aurora, Ill., a corporation of Illinois Application March 16, 1950, Serial No. 150,034

6 Claims. (Cl. 210—55)

In water clarification tanks, water is flowed through a preliminary zone where it is mixed with chemicals or flocculated and is then flowed upwardly through a clarifying zone. The particles causing turbidity or the precipitates resulting from softening settle at the bottom of the tank and are removed.

Heretofore, the practice with such tanks has been to endeavor to minimize currents in the clarification chamber, even toward the bottom thereof. In the flocculating or accretion zone where eddy currents were desired, they were allowed to occur in a rather hit or miss fashion. According to the present invention, controlled circulating currents in the nature of uniform rolls are intentionally provided in such manner that they ensure good distribution of incoming water throughout the flocculation zone and the water leaving the flocculating zone likewise is well distributed throughout the bottom area of the clarification zone.

Additional objects and advantages of the invention will be apparent from the following discussion and from the drawings.

Designation of figures

Figure 1 is a vertical, sectional view through the form of apparatus chosen for illustration, the right-hand position thereof being broken away, Figure 2 is a detailed sectional view on a larger scale, showing the mounting of the sludge collector, Figure 3 is a detailed fragmentary plan view showing the adjustable deflector gates, and Figure 4 is a fragmentary plan view of the apparatus shown in Figure 1.

General description

Although the law requires a full and exact description of at least one form of the invention, such as that which follows, it is, of course, the purpose of a patent to cover each new inventive concept therein, no matter how it may later be disguised by variations in form or additions of further improvements; and the appended claims are intended to accomplish this purpose by particularly pointing out the parts, improvements or combinations in which the inventive concepts are found.

The invention has been illustrated as used in a large circular tank 11. A circular partition 12 forms an agitation chamber 13 in a central area of the tank. The partition 12 preferably rests on the floor 14 of the tank. Raw water (with which may have been mixed any desired softening chemicals, coagulants, or the like) is supplied through intake pipe 15 to agitation chamber 13, a downward deflector 16 preferably being provided.

Surrounding the partition 12 in at least the upper portion of the tank is an annular partition 17 forming a reaction chamber 18 between the partitions 12 and 17. In practice, this reaction chamber may be somewhat wider than has been shown. The term "reaction chamber" is used in a broad sense to include not only chemical reaction but physical reaction such as flocculation or accretion which may occur as well as or instead of chemical reaction. The water flows from the bottom of the reaction chamber 18 into the lower portion of the clarifying zone 19. As the water rises in this zone, the solids settle out. The clarified water is drawn out by overflowing into a plurality of launders 21 which deliver water to a drop box 22 communicating with outlet 23. As best seen in Fig. 4, the launders extend entirely around the tank and are spaced so as to be fairly close to all parts of the surface of the water, preferably close enough to draw effectively from the entire area of the tank's clarifying zone at and just below the surface.

Novel feature and details

According to the present invention, a plurality of ports 24 are provided with approximately even spacing around the top of the partition 12. Outside of each port a deflector 26 is provided. As best seen in Fig. 4, these deflectors 26 all direct the flow of water in the same generally circumferential direction. Thus they have all been shown as directing the water in a clockwise direction when seen from above. The deflectors 26 are preferably adjustable by adjustment nuts 27 as best seen in Fig. 3. They should be adjusted to such a point that there is an appreciable differential in the hydrostatic pressure or water level on the inside and outside of partition 12. This tends to ensure uniform velocity of flow through the various ports 26 and a sufficient velocity of flow to impart a definite rolling motion to the water in reaction chamber 18. It has been found satisfactory to so restrict the flow by deflectors 26 that the water level in agitation chamber 13 would be about three inches higher than the top of launders 21 during normal operation. Even a differential of one inch will provide an improvement over the prior art.

The roll thus imparted to the water in reaction chamber 18, together with the relatively substantial velocity of the various streams flowing into it at frequent points ensures uniform distribution of the water from agitation chamber 13 throughout the upper portion of reaction chamber 18. The concentric rolling movement of water in reaction chamber 18 is preferably substantially unobstructed throughout the period that it is passing downwardly through the reaction chamber 18 and out of the reaction chamber 18 into the bottom of the clarification zone 19. Accordingly, when the water enters the clarification zone 19 it has retained a substantial amount of this roll as well as a downward component of movement. This downward movement together with the weight of the particles in this column of water tend to make it move fairly rapidly toward the bottom of the tank 11. Without the roll, it would tend to spread out somewhat but with a very irregular pattern. The water would then tend to "channel," passing more rapidly along some paths than others. The roll greatly reduces this tendency by (a) ensuring uniformity of the character of the water at various points, (b) avoiding channelling of the water in the reaction zone with unequal flow therefrom, and (c) giving the water a more positive spreading tendency with the result that it distributes itself fairly evenly throughout the bottom area of the clarification zone 19. The result is an exceptionally high uniformity and efficiency of the clarifying or settling action, which is enhanced by the provision of the plurality of launders 21 so that the draw-off is fairly uniform throughout the surface of the clarification zone.

A bridge 28 may be supported by beams 29, resting on partition 12 or steel columns. The partition 17 is suspended from the beams 29, with additional points of suspension from bridge 28. Launders 21 are carried by truss-like beams 31 which may be supported at one end by the side walls of tank 11 and at the other end by partition 17. An agitator 32 in agitation zone 13 may be of the paddle or propeller type and is driven by a motor 33 carried by bridge 28.

Although the invention has been illustrated in connection with a circular tank, it can be used (and most of its benefits secured) in a rectangular tank. In such tanks, transverse partitions may form agitation and reaction zones, each extending across the tank. With such a construction, the deflectors at the ports between the agitation chamber and the reaction chamber may be positioned to impart a vertical roll to the water in the reaction chamber. To avoid short circuiting, the reaction chamber may have a partial partition, again with water flowing therethrough into the second section under substantial pressure and against deflectors which give the desired roll in the second section. Although this lacks the feature of sweeping the body of water past the successive ports a very definite roll can, nevertheless, be obtained with uniformity in the action and character of the water. Such uniformity may require more care in setting the deflector gates than in the illustrated form. Such a vertical roll must be separated from the clarification zone by partial partition means more completely than the partial partition means 17 in Fig. 1. Nevertheless, there should be open communication in the sense that there is practically no pressure differential. This permits water to peel off uniformly from the roll across the entire width of the tank with substantially uniform velocity, the velocity resulting from the roll (preferably with a direction of roll to sweep the water out) rather than from heterogeneous velocities resulting from eddy currents.

Although the chamber 18 has been spoken of as a reaction chamber, it (or the lower part of it) could be deemed a distribution chamber. From this standpoint, it makes no difference what precedes it and what takes place within it, so long as it provides a uniform roll of the water with the character of the water uniform and the speed of the roll sufficient to prevent channeling of water through the distribution chamber. The provision of a plurality of uniformly acting and equally spaced ports into the distribution chamber facilitates and may even be essential for providing this uniform roll.

The speed of the roll is an important factor. In some installations, a speed of one foot per second has been found to be highly satisfactory. It is believed that a speed of anything over .5 foot per second will substantially eliminate channeling. Of course the speed must not be great enough to result in stirring throughout the clarification chamber.

The best speed may depend somewhat on the nature of the particles within the water. For the purpose of ensuring uniformity, a speed sufficient to prevent perceptible de-entrainment of the solids within the roll is desired. By this is not meant to prevent a few especially heavy solids from settling but rather to prevent an appreciable variation in the character of the water. Preferably the deflectors 26 are adjusted so that with the ordinary rate of flow the ports 24 are restricted just enough so that there is no visible partial clarification of any of the water in the roll.

Another factor which tends toward uniformity of the character of the water throughout the roll is that the roll does not pass through any zone into solids settled from the clarification chamber. Of course the roll may include solids recirculated through the pipe 51 but these are thoroughly mixed with the water in the agitation chamber 13 before they pass to the roll. The movement of the water in agitation chamber 13 preferably includes noticeable heterogeneous eddy currents and in fact need not include any definite roll.

A collector mechanism 34 is preferably provided for scraping the sediment or sludge into an annular concentric sludge hopper 36. The horizontal arms 34 of the collector carry scraper bars 37 disposed angularly to work the sludge toward hopper 36. They also carry blades 38 for agitating the sludge in the hopper. Under some conditions this might keep the sludge in a loose condition so that it may easily be drawn off but the more usual purpose is to thicken the sludge by working water out of it. Preferably, the sludge is drawn off periodically through drain pipe 39 by automatic control by the automatically-actuated valve 40. The arms 34 are carried by a ring 41 which is provided with a turntable bearing and is driven by a chain 42. The chain 42 passes around a sprocket 43 which is driven by motor 44 carried on bridge 28. The chain may be engaged by teeth on ring 41.

The turntable bearing may comprise a set of support rollers 46 running on a stationary horizontal flange 47 and a set of side thrust rollers 48 rotating about fixed axes and bearing against ring 49 rigidly associated with ring 41. This type of bearing may be of large overall diameter so that partition 12 may extend to the floor 14 and be used for support.

The large diameter of the annular sludge-collecting hopper 36 is desirable. It provides a satisfactory storage capacity with a shallow hopper. Perhaps more important is the fact that the thickener blades 38 have a satisfactory speed of movement through the hopper even though the scraper blades 37 move at a conventionally slow speed. At present, it is desired that the thickener blades move about ten feet per minute although a speed anywhere from five feet to fifteen feet per minute is believed to be reasonably satisfactory. A further advantage of the large diameter for hopper 36 is that the sludge does not need to be moved as far on the average from the point of settling. This is particularly significant in view of the fact that the movement of the sludge is upstream or in opposition to the flow of adjacent water. To some extent these advantages could be obtained by locating the hopper 36 just outside of the portion of the floor 14 on which partition 12 rests. Preferably, however, the advantages are obtained still more effectively by positioning the hopper 36 between scraper blades. It will be observed that those scraper blades 37 which are located inwardly from hopper 36 are inclined in the opposite direction as compared to the other scraper blades 37, so that the former will scrape sludge outwardly while the latter scrape sludge inwardly.

For some operations it is desired to return sludge to the agitation chamber 13. For this purpose, a draw-off pipe 51 is provided communicating with hopper 36. At its upper end it communicates with a pump 52 which is driven by a motor 53 carried by the bridge 28.

Although the deflectors 26 may take almost any form, it is preferred that each be provided with a horizontal plate 54 (Fig. 3) below the water level, preferably along the bottom of deflector 26 for confining the flow of water mainly to a horizontal direction.

From the foregoing, it is seen that a very efficient water-clarifying apparatus and method have been provided, the efficiency being accomplished mainly by controlled currents which ensure complete distribution of the water through the desired areas.

This apparatus and method can be used for activated sludge treatment of wastes and other such treatments, the term "water clarification" being used broadly.

I claim:

1. Water-treating apparatus including a tank, partition means separating a central portion of the tank from the remainder of the tank to form a centrally-located agitation chamber, means for flowing raw water to said agitation chamber, annular launder means outside of the partition means for drawing off water from the surface zone of a clarifying zone, means for agitating water in the agitation chamber, outer partition means substantially spaced from the periphery of the tank to form a clarification chamber and surrounding the first-named partition means to form an annular reaction chamber between the partition means, ports in the first-named partition means for the flow of water from the agitation chamber to the reaction chamber and deflectors associated with the ports for imparting to the water entering the reaction chamber a generally horizontal roll so that the entire body of water in the reaction chamber moves around the agitation chamber, the reaction chamber being substantially free of obstructions inhibiting said roll and being open and substantially unobstructed at its bottom, whereby said roll of the water is maintained, with a uniform rolling velocity greater than the velocity of flow by advancement as the water passes from the reaction zone toward the bottom of the tank, to spread the water by centrifugal force through the bottom of the clarification zone surrounding the partition means, said ports and deflectors being positioned approximately uniformly around the agitation chamber and being of an effective size to restrict the flow to create a hydrostatic pressure differential during normal flow to ensure approximate uniformity of flow through the various ports and ensure distribution of the water flowing therethrough to the entire upper area of the reaction zone.

2. Water-treating apparatus including a tank, partition means separating a central portion of the tank from the remainder of the tank to form a centrally-located agitation chamber, means for flowing raw water to said agitation chamber, annular launder means outside of the partition means for drawing off water from the surface zone of a clarifying zone, means for agitating water in the agitation chamber, outer partition means substantially spaced from the periphery of the tank to form a clarification chamber and surrounding the first-named partition means to form an annular reaction chamber between the partition means, ports in the first-named partition means for the flow of water from the agitation chamber to the reaction chamber and deflectors associated with the ports for imparting to the water entering the reaction chamber a generally horizontal roll so that the entire body of water in the reaction chamber moves around the agitation chamber, the reaction chamber being substantially free of obstructions inhibiting said roll and being open and substantially unobstructed at its bottom, whereby said roll of the water is maintained, with a uniform rolling velocity greater than the velocity of flow by advancement, as the water passes from the reaction zone toward the bottom of the tank, to spread the water by centrifugal force through the bottom of the clarification zone surrounding the partition means, said ports and deflectors being positioned approximately uniformly around the agitation chamber.

3. The method of treating water which includes the step of flowing the water into an agitation chamber, agitating it in said chamber, flowing it somewhat tangentially from a plurality of points around said chamber into an annular zone in a reaction chamber surrounding the agitation chamber to produce an over-all uniform and homogeneous annular roll around the agitation chamber having a velocity of at least .5 ft. per second and sufficient to prevent perceptible detraining of the solids, flowing the water from the reaction chamber to a lower portion of a clarification chamber with outward flow from the periphery of the roll substantially uniformly around the roll, drawing off clarified water from an upper portion of the clarification chamber, and maintaining the water in the agitation chamber under a substantially greater hydrostatic head at least one inch higher than the water in the reaction chamber.

4. Water-clarifying apparatus including a tank, partial partition means forming a clarifying chamber on one side thereof and a distribution chamber on the other side in free and open communication with the lower portion of the clarification chamber, inflow means for flowing water to be treated to evenly spaced points in said distribution chamber and directed at all of said points in a somewhat tangential direction about an axis, and means for drawing off water from the clarification chamber, said inflow means being constricted for imparting enough speed to the inflowing water at said points for moving the water within the distribution chamber predominantly with an over-all uniform and homogeneous roll about said axis with a velocity at least .5 ft. per second and sufficient to prevent perceptible detraining of the solids, said distributing chamber being substantially free from obstructions impeding said roll and having an over-all dimension perpendicular to said axis smaller than the like dimension of the clarification chamber, and said clarification chamber being beyond said distribution chamber from said axis whereby the water flows by combined gravity and momentum from the peripheral portion of the roll away from the axis in passing to the clarification chamber and along the lower portion thereof.

5. The method of treating water to remove minute particles therefrom which includes flowing it through a partially confined zone while maintaining the water in said zone rotating with a substantially homogeneous over-all roll at least .5 ft. per second and fast enough to substantially prevent settling out of the particles, flowing the water from the periphery of the roll from said zone outwardly of the roll through an interconnecting area having a horizontal length transversely of the flow substantially as great as that of the roll into the lower portion of a larger clarification zone with substantially uniform flow along the length of said interconnecting area, and with a speed of spreading outwardly of the roll resulting in part from the rotary speed of the roll, and drawing off clarified water from the upper part of the clarification zone.

6. Water-clarifying apparatus including a tank, partial partition means forming a clarifying chamber on one side thereof and a distribution chamber on the other side in free and open communication with the lower portion of the clarification chamber, inflow means for flowing water to be treated to a plurality of points spaced completely around said distribution chamber and directed at all of said points in a somewhat tangential direction about an axis, and means for drawing off water from the clarification chamber, said inflow means being constricted for imparting enough speed to the inflowing water at said points for moving the water within the distribution chamber predominantly with an over-all uniform and homogeneous roll about said axis with a velocity at least .5 ft. per second and sufficient to prevent perceptible detraining of the solids, said distributing chamber being substantially free from obstructions impeding said roll and having an over-all dimension perpendicular to said axis smaller than the like dimension of the clarification chamber, and said clarification chamber being beyond said distribution chamber from said axis whereby the water flows by combined gravity and momentum from the peripheral portion of the roll away from the axis in passing to the clarification chamber and along the lower portion thereof.

JAMES DONALD WALKER.

References Cited in the file of this patent

UNITED STATES PATENTS

| Number | Name | Date |
|---|---|---|
| 1,851,684 | Pruss | Mar. 29, 1932 |
| 2,021,304 | Hardinge | Nov. 19, 1935 |
| 2,098,467 | Sayers | Nov. 9, 1937 |
| 2,143,750 | Darby et al. | Jan. 10, 1939 |
| 2,279,970 | Coe | Apr. 14, 1942 |
| 2,291,772 | Talbot et al. | Aug. 4, 1942 |
| 2,368,703 | Bousman | Feb. 6, 1945 |
| 2,370,356 | Kamp et al. | Feb. 27, 1945 |
| 2,411,386 | Parker et al. | Nov. 19, 1946 |
| 2,419,004 | Bieker et al. | Apr. 15, 1947 |
| 2,444,671 | Prager | July 6, 1948 |
| 2,525,842 | Thompson et al. | Oct. 17, 1950 |